P. BARDUCCI.
DRYING PLANT.
APPLICATION FILED JAN. 19, 1920.

1,368,537.

Patented Feb. 15, 1921.
2 SHEETS—SHEET 1.

Inventor:
Pilade Barducci
By Lawrence Langner
Attorney

P. BARDUCCI.
DRYING PLANT.
APPLICATION FILED JAN. 19, 1920

1,368,537.

Patented Feb. 15, 1921.
2 SHEETS—SHEET 2.

INVENTOR:
Pilade Barducci
By Lawrence Langner
ATTORNEY.

UNITED STATES PATENT OFFICE.

PILADE BARDUCCI, OF NAPLES, ITALY.

DRYING PLANT.

1,368,537.  Specification of Letters Patent.  Patented Feb. 15, 1921.

Application filed January 19, 1920. Serial No. 352,263.

*To all whom it may concern:*

Be it known that I, PILADE BARDUCCI, a subject of the King of Italy, and resident of Naples, Italy, have invented certain new and useful Improvements in Drying Plants, of which the following is a specification.

This invention relates to drying plants and has for its object an arrangement for producing a strong ventilation by means of vertical air currents acting in a confined space, said arrangement comprising a traveling ventilating device causing the air to circulate around a horizontal axis along a path either parallel or transverse with regard to path of travel of said device, the action of said current being confined to the space corresponding to the position occupied at the time by said ventilating device.

The above described operation may be obtained by means of a ventilating device having reduced vertical size or height, the same being thus adapted to be used in connection with drying rooms or cells having reduced height.

Figure 1:
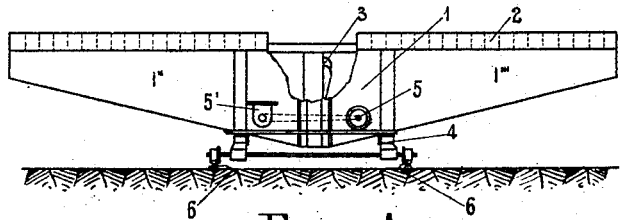
Figure 2:
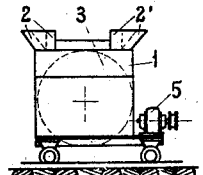
Figure 5:
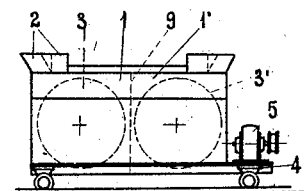
Figure 6:
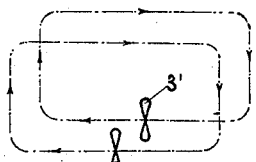
Figure 7:
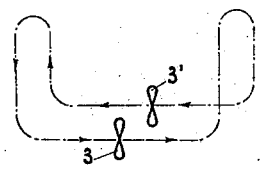
Figure 10:
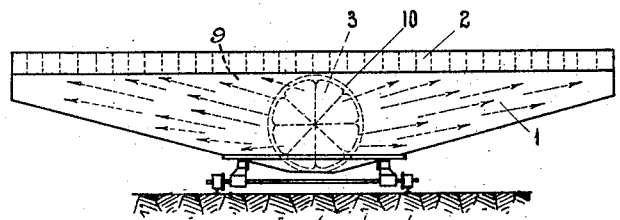
Figure 11:
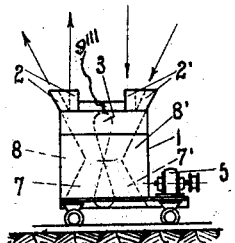
Figure 13:
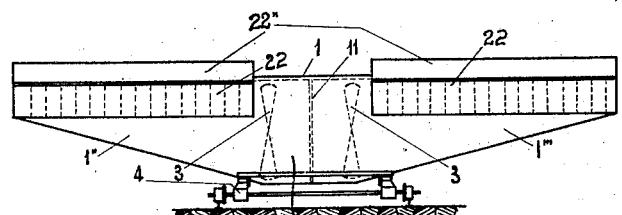
Figure 14:
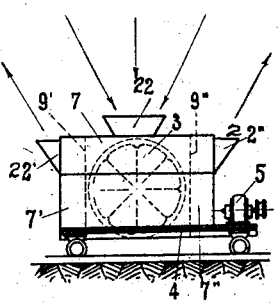
Figure 3:
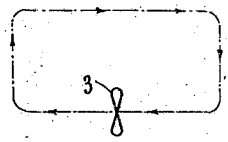
Figure 4:
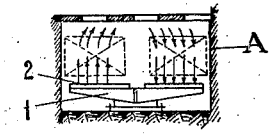
Figure 8:
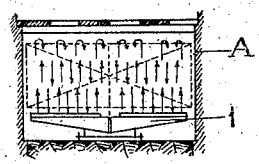
Figure 9:
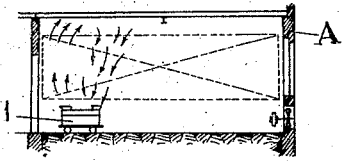
Figure 12:
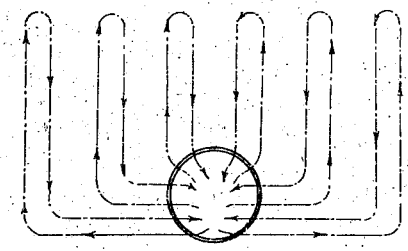
Figure 15:
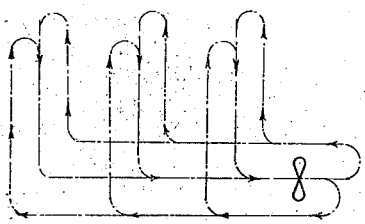
Figure 16:
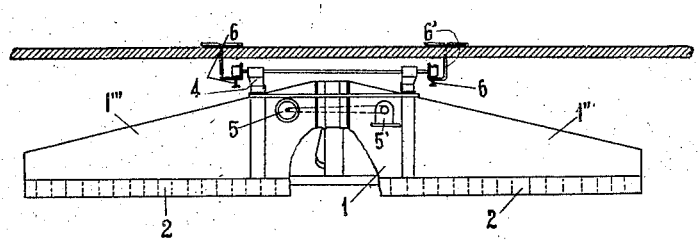

The annexed drawings show by way of example some embodiments of this invention. Figure 1 is a front outer view of a ventilating device; Fig. 2 is the side view of the same and Fig. 3 is a diagram showing the path of air currents generated by the device shown in Figs. 1 and 2; Fig. 4 is the transverse section of a drying cell provided with said ventilating device; Fig. 5 is the side view of a device comprising two coupled casings; Fig. 6 shows the path of air current obtained by the device according to Fig. 5; Fig. 7 shows the path of air current obtained by means of a modified operation of said device; Figs. 8 and 9 are the transverse and longitudinal sections, respectively, of a drying cell provided with the ventilating device shown in Fig. 5; Figs. 10 and 11 are the front and side views of another construction of said device; Fig. 12 shows the path of air currents produced by the same: Figs. 13 and 14 are respectively the front and side view of another construction of ventilating device and Fig. 15 shows the paths of air currents produced by said device. Fig. 16 is a front view of a ventilating device arranged to run near the top wall of the chamber.

In the construction shown by Figs. 1 and 2 the ventilating device comprises a casing 1 having elongated shape and provided with a number of mouths or openings 2 and 2', these mouths being preferably arranged in two rows located at the front edges of the top wall of said casing. Within said casing 1 is arranged a propeller 3 located in a plane perpendicular to the long axis of said casing, so as to provide two side sections 1" and 1''' in said casing, said propeller acting to drive through the mouths 2 and 2' of one of said side sections the air drawn into the casing through mouths 2 and 2' of the other side section. Casing 1 is mounted on a truck or carriage 4 having wheels adapted to run on a track 6 arranged in the cell or room in such a manner as to cause said casing to travel therein along a path perpendicular to its long axis. As shown in the drawing said truck is provided with driving means as an electromotor 5 and a speed reducing gear 5' adapted to operate the wheels of the truck for causing the casing to travel along the room or cell.

The above described device gives rise to the air circulation shown diagrammatically by Fig. 3 and as the same is mounted within room A in the manner shown by Fig. 4, that is with its mouths 2—2' arranged along lines perpendicular to the path of travel of the casing within the room, an air current is obtained in succession in the several portions of the room corresponding with the position occupied at the time by said casing during its travel, said air current being directed in a transverse direction with regard to the path of the casing, and the air is thus caused to circulate around an axis parallel with the travel of the casing.

The construction of ventilating device shown by Fig. 5 comprises two adjacent casings 1 and 1' each like to that described in connection with Figs. 1 and 2 and mounted on the same truck or carriage 4; said casings have mouths in their top walls near the front edges of the same, the contacting edges of said walls being on the contrary not provided with mouths. The hollows of said casings are separated from each other by a longitudinal partition as shown diagrammatically by 9 in Fig. 5 and in each chamber thus provided is located a propeller 3—3' respectively, each adapted to draw air through mouths of a side section of each casing and to propel the same through the mouths of the other side section. By causing said propellers to operate in the same direction the air circulation shown in Fig. 6 may be obtained, this circulation comprising two air streams each like to that shown and described in connection with Fig. 3; on the contrary by causing said propellers to operate in opposite directions the air circulation shown by Fig. 7 may be obtained.

This circulation comprises an air current which moves in a direction in one of said casings and rises through the mouths of a side section of the same; the rising air is drawn through the mouths of the adjacent side section of the other or second casing and is propelled through this latter in a direction opposite to that of the air in first casing so as to issue or rise through the mouths of the side section of the second casing which are adjacent to inlet mouths of the first casing, the air being thus drawn into this casing and so on.

The air is thus propelled in opposite directions within said casings and in the space above the mouths of the same, and in the room or cell are produced two air currents directed parallel to the path of said ventilating device in the cell or room, these air currents taking place in opposite directions around an axis transverse with regard to the path of said device.

This operation of the ventilating device in the room or cell A is shown by Figs. 8 and 9 in which the material to be dried is assumed to be located above said device and the same is acted on in succession by air currents having opposite directions during the travel of the ventilating device along the room or cell.

The same air circulation around an axis perpendicular with regard to the path of travel of the ventilating device in the cell or room may be obtained by means of other constructions of the traveling device. A type of such a construction is shown by Figs. 10 and 11 in which the casing 1 is provided with a partition 9''' providing therein two chambers 7 and 7' parallel with the long axis of said casing and each having mouths 2—2' at the front edge of its top wall, said partition 9''' is provided with an opening 10 in which is mounted a propeller 3 adapted to draw air through the mouths of one of said chambers, say 7', and to drive the same through the mouths of the other one say 7. Each of said chambers 7 and 7' is preferably provided with a cone 8—8' in register with said propeller, said cones being intended to evenly distribute the air within the same chambers.

This operation of the ventilating device is shown diagrammatically by Fig. 12 in which it is shown that the air currents departing from the exhaust side of the propeller are caused to rise through the mouths of the corresponding chamber or section of the casing and in the space above the same, said air being then deflected and caused to enter the other section of the casing for reaching the suction side of the propeller.

Figs. 13 and 14 illustrate another construction of the ventilating apparatus giving rise to a like ventilation.

In this construction the casing 1, which has an elongated shape with its long axis arranged perpendicularly with regard to the path of travel of said casing within the room or cell as above described, is provided with a transverse partition 11 forming therein two side chambers 1'' and 1'''; each chamber is provided with two longitudinal partitions 9' and 9'' providing therein three longitudinal sections or chambers 7, 7' and 7'' opening in a common space 7''' and each provided with a number of mouths 22, 22' and 22'' in their respective top portions. At the mouth of the intermediate chamber 7 opening into said chamber 7''' is arranged a propeller 3 adapted to draw air through the mouths of a number of said chambers, say through mouths 22 of chamber 7, and to force it into said common chamber 7'''. The air thus forced into chamber 7''' is thus caused to enter said side chambers 7' and 7'' and to issue through mouths 22' and 22'' of the same, said air being thus caused to rise in the space above said mouths and being again drawn through mouths 22 into intermediate chamber 7; this circulation is shown diagrammatically by Fig. 15.

Obviously the operation of propellers 3 may be reversed and in this case the same draw air through mouths 2' and 2'' of chambers 7' and 7'' and force out said air through mouths 2 of chamber 7.

It is clear that by any of the described ventilating devices an air circulation is obtained which takes place around a horizontal axis and is directed parallel or transverse with regard to the long axis of the casing of said device; said air circulation gives rise, in the space outside to said casing, to air currents which may be directed either in the same or in opposite direction and act in a confined space corresponding with the position occupied at the time by said casing, so that by causing said casing to travel or reciprocate within the room or cell, the material contained therein is acted on in succession by air currents having opposite directions and an intensity varying in a gradual manner.

In the above described arrangements the ventilating device is assumed to be arranged to run on the ground or floor of the room or chamber, but the same may also be arranged near the roof of the room, in this case the position of the casing must be reserved as shown by Fig. 16 in which the corresponding parts are indicated by the same references as in the other figures.

In this construction the rails 6 on which runs the casing 1 are carried by brackets 6' hung to the roof of the room; also in this case the mouths of the casing open in front of the space in which is located the material to be dried.

In connection with subject matter disclosed but not claimed herein attention is called to my copending applications Serial Nos. 317,900 filed August 16, 1919, 352,266 filed January 19, 1920, and 352,267 filed January 19, 1920, and my Patent No. 1,344,163 granted June 22, 1920.

What I claim as my invention and desire to secure by United States Letters Patent is:—

1. In a plant for drying materials comprising a room for said materials, a casing adapted to travel in said room, means for driving said casing, said casing having mouths arranged along lines transverse with regard to path of said casing in said room, and air propelling means in said casing, said air propelling means drawing air through a number of said mouths and forcing the same through other mouths to cause said air to circulate around a horizontal axis in said room.

2. In a plant for drying materials comprising a room for said materials, a casing adapted to travel in said room, means for driving said casing, said casing having mouths in one of its horizontal walls arranged in a plane transverse with regard to the path of said casing in said room, and air propelling means in said casing, said propelling means drawing air through a number of said mouths and forcing the same through other mouths to cause said air to circulate around a horizontal axis in said room.

3. In a plant for drying materials comprising a room for said materials, a casing having elongated shape and adapted to travel in said room along a path perpendicular to its long axis, said casing having mouths arranged in rows parallel to its long axis, and air propelling means in said casing, said propelling means drawing air through a number of said mouths and forcing the same through other mouths to cause said air to circulate around a horizontal axis in said room.

4. In a plant for drying materials comprising a room for said materials, a casing adapted to travel in said room, means for driving said casing, means providing chambers in said casing, said chambers having mouths arranged in rows transverse with regard to the path of said casing in said room, and air propelling means in said casing, said propelling means drawing air through a number of said mouths and forcing the same through other mouths to cause said air to circulate around a horizontal axis in said room.

5. In a plant for drying materials comprising a room for said materials, a casing adapted to travel in said room, means for driving said casing, means providing chambers in said casing, said chambers having mouths arranged in rows transverse with regard to the path of said casing in said room, and air propelling means in said casing, said propelling means drawing air through the mouths of a number of said chambers and forcing the same through mouths of other chambers to cause said air to circulate around horizontal lines in said room.

6. In a plant for drying materials comprising a room for said materials, a casing having elongated shape and adapted to travel in said room along a path perpendicular to its long axis, means for driving said casing, said casing having mouths arranged along lines parallel with its long axis and air propelling means in said casing, these means drawing the air through a number of said mouths, propelling the same in said casing in a direction parallel with the long axis of the same and forcing said air through other mouths to cause the same to circulate around a horizontal axis in said room.

7. In a plant for drying materials comprising a room for said materials, a casing having elongated shape and adapted to travel in said room along a path perpendicular to its long axis, means for driving said casing, partitions providing chambers in said casing the same being parallel with said long axis, said chambers having mouths arranged along lines parallel with said long axis, air propelling means in said chambers, these means drawing air through a number of said mouths, propelling the same through said chambers and forcing the same air through other mouths to cause the same to circulate around horizontal lines in said room.

8. In a plant for drying materials comprising a room for said materials, a casing having elongated shape and adapted to travel in said room along a path perpendicular to its long axis, means for driving said casing, partitions providing chambers in said casing the same being parallel with said long axis, said chambers having mouths arranged along lines parallel with said long axis, and air propelling means in said chambers, the propelling means of a chamber drawing air through a number of said mouths of the same and forcing it through other mouths and the propelling means of the adjacent chamber drawing air through the mouths of the same adjacent to exhaust mouths of adjacent chamber and forcing it through mouths adjacent to suction mouths of adjacent chamber to cause the air to circulate around horizontal lines in said room.

9. In a plant for drying materials comprising a room for said materials, a casing adapted to travel in said room, means for driving said casing, said casing having mouths in one of its horizontal walls arranged along lines transverse with regard to the path of said casing in said room, the mouths arranged near the front edges of said wall spreading toward outside, and air propelling means in said casing, said propelling means drawing air through a number of said mouths and forcing the same through other mouths to cause said air to circulate around a horizontal axis in said room.

Signed at Naples, Italy, this 8 day of December, A. D. 1919.

PILADE BARDUCCI.